(12) United States Patent
Gerhart et al.

(10) Patent No.: US 9,687,783 B2
(45) Date of Patent: Jun. 27, 2017

(54) AMMONIA GAS GENERATOR AND USE OF THE SAME FOR REDUCING NITROGEN OXIDES IN EXHAUST GASES

(71) Applicant: ALZCHEM AG, Trostberg (DE)

(72) Inventors: Christian Gerhart, Siegsdorf (DE); Henning Middelmann, Herdecke (DE)

(73) Assignee: ALZCHEM AG, Trostberg (DE)

( * ) Notice: Subject to any disclaimer, the term of this patent is extended or adjusted under 35 U.S.C. 154(b) by 0 days.

(21) Appl. No.: 14/653,379

(22) PCT Filed: Dec. 19, 2013

(86) PCT No.: PCT/EP2013/077436
§ 371 (c)(1),
(2) Date: Jun. 18, 2015

(87) PCT Pub. No.: WO2014/096217
PCT Pub. Date: Jun. 26, 2014

(65) Prior Publication Data
US 2015/0314238 A1 Nov. 5, 2015

(30) Foreign Application Priority Data

Dec. 21, 2012 (DE) .......................... 10 2012 025 112
Dec. 21, 2012 (DE) .......................... 10 2012 025 113

(51) Int. Cl.
*B01D 53/94* (2006.01)
*F01N 3/20* (2006.01)
(Continued)

(52) U.S. Cl.
CPC ......... *B01D 53/9431* (2013.01); *B01D 53/90* (2013.01); *C01C 1/08* (2013.01);
(Continued)

(58) Field of Classification Search
None
See application file for complete search history.

(56) References Cited

U.S. PATENT DOCUMENTS 5,045,292 A * 9/1991 Ruegg .................. F23J 7/00
423/235
5,628,186 A 5/1997 Schmelz
(Continued)

FOREIGN PATENT DOCUMENTS

DE 4038054 6/1992
DE 4230056 3/1994
(Continued)

OTHER PUBLICATIONS

International Patent Application No. PCT/EP2013/077436, International Search Report dated May 6, 2014.
(Continued)

*Primary Examiner* — Melvin C Mayes
*Assistant Examiner* — Sheng H Davis
(74) *Attorney, Agent, or Firm* — Kilpatrick Townsend & Stockton LLP

(57) ABSTRACT

Ammonia gas generator for producing ammonia from a solution of an ammonia precursor substance comprising a catalyst unit, which comprises a catalyst for the decomposition and/or hydrolysis of ammonia precursor substances into ammonia and a mixing chamber arranged upstream of the catalyst, an injection device for introducing the solution of the ammonia precursor substance into the mixing chamber, and an outlet for the ammonia gas formed, wherein the injection device comprises a nozzle which produces droplets having a Sauter mean diameter $D_{32}$ of 26 to 100 μm.

26 Claims, 3 Drawing Sheets

Figure 1:
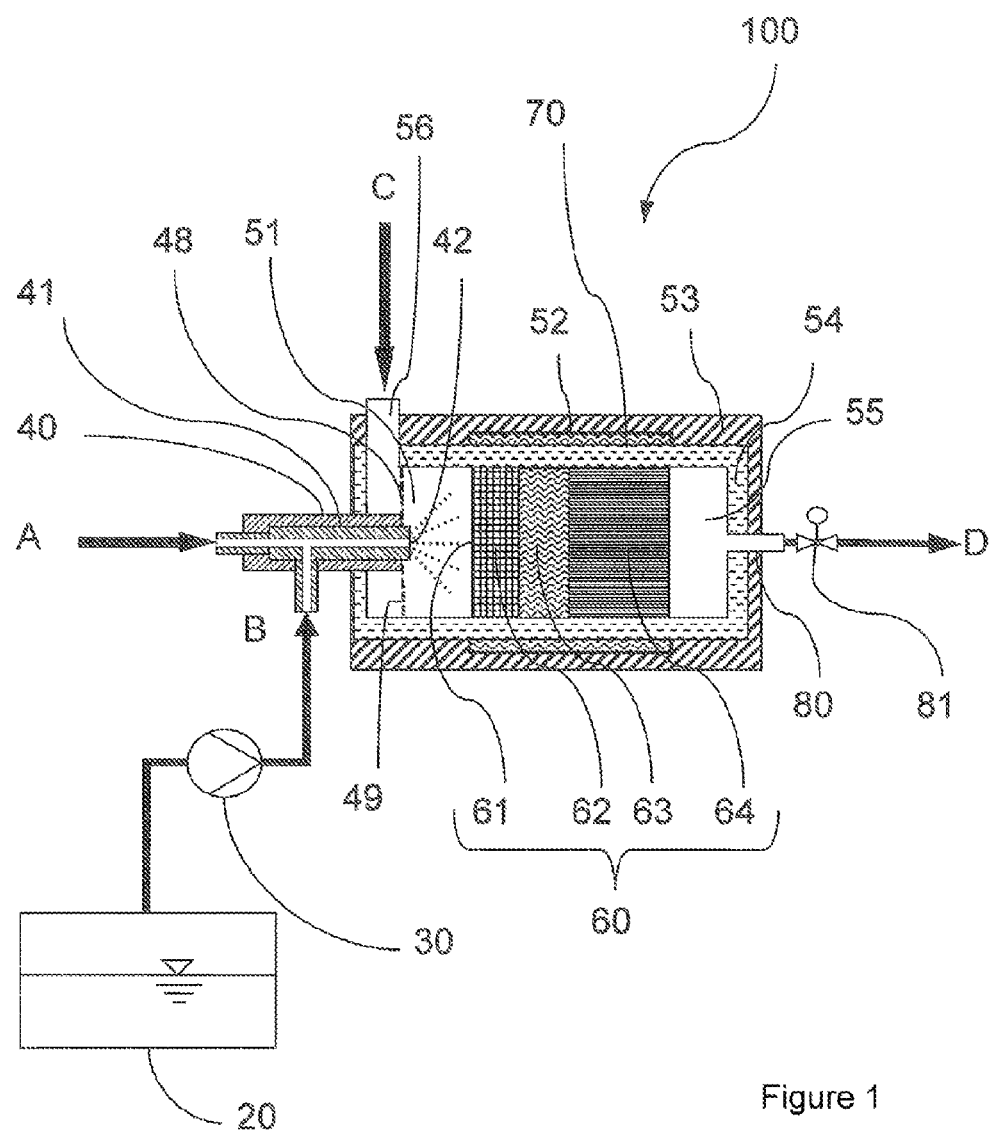

(51) Int. Cl.
  *F01N 3/035*    (2006.01)
  *B01D 53/90*    (2006.01)
  *C01C 1/08*     (2006.01)
  *F01N 3/28*     (2006.01)

(52) U.S. Cl.
  CPC .............. *C01C 1/086* (2013.01); *F01N 3/035* (2013.01); *F01N 3/206* (2013.01); *F01N 3/2066* (2013.01); *F01N 3/2892* (2013.01); *B01D 53/9477* (2013.01); *B01D 2251/2062* (2013.01); *B01D 2251/2067* (2013.01); *B01D 2255/20707* (2013.01); *F01N 2240/25* (2013.01); *Y02T 10/24* (2013.01)

(56) References Cited

U.S. PATENT DOCUMENTS

| | | | | |
|---|---|---|---|---|
| 6,048,510 | A * | 4/2000 | Zauderer | F23J 7/00 423/235 |
| 2006/0101811 | A1* | 5/2006 | Linna | B01D 53/9495 60/286 |
| 2009/0127511 | A1* | 5/2009 | Bruck | B01D 53/90 252/372 |
| 2009/0297417 | A1* | 12/2009 | Sun | B01B 1/005 423/239.1 |
| 2010/0170225 | A1* | 7/2010 | Opris | F01N 3/2066 60/286 |
| 2010/0319322 | A1* | 12/2010 | Huthwohl | F01N 3/2066 60/285 |
| 2011/0232267 | A1 | 9/2011 | Brueck | |
| 2012/0087840 | A1 | 4/2012 | Hirschberg | |

FOREIGN PATENT DOCUMENTS

| | | |
|---|---|---|
| DE | 4417238 | 9/1994 |
| DE | 4315278 | 11/1994 |
| DE | 19515352 | 11/1995 |
| DE | 102008063488 | 6/2010 |
| EP | 1956206 | 8/2008 |
| JP | 2006122792 | 5/2006 |

OTHER PUBLICATIONS

German Application No. DE102012025112.2, German Search Report dated Nov. 8, 2013.
German Application No. DE102012025113.0, German Search Report dated Nov. 12, 2013.

* cited by examiner

AMMONIA GAS GENERATOR AND USE OF THE SAME FOR REDUCING NITROGEN OXIDES IN EXHAUST GASES

PRIOR RELATED APPLICATIONS

This application is a National Phase application of International Application No. PCT/EP2013/077436, filed Dec. 19, 2013, which claims priority to German Application No. 10 2012 025 113.0, filed Dec. 21, 2012, and German Application No. 10 2012 025 112.2, filed Dec. 21, 2012, each of which is incorporated herein by reference in its entirety.

The present invention relates to an ammonia gas generator for producing ammonia from an ammonia precursor substance, a method for the production of ammonia, and the use thereof in exhaust gas post-processing systems for reducing nitrogen oxides in exhaust gases.

Exhaust gases from internal combustion engines often contain substances which are harmful if emitted into the environment. Therefore, many countries have set thresholds for the emission of such harmful substances, found for example in the exhaust gas from industrial plants or motor vehicles, which need to be adhered to. The harmful substances referred to include nitrogen oxides ($NO_x$), such as in particular nitrogen monoxide (NO) or nitrogen dioxide ($NO_2$), in addition to a range of other harmful substances.

The emission of said nitrogen oxides from the exhaust gases of internal combustion engines can be reduced in various different ways. Of particular note in this connection is reduction by means of additional exhaust gas post-processing measures which use selective catalytic reduction (SCR) in particular. A feature common to these methods is that a reducing agent acting selectively on nitrogen oxides is added to the exhaust gas, and then in the presence of a suitable catalyst (SCR catalyst) the nitrogen oxides are converted. In this way the nitrogen oxides are converted into less polluting substances, for example nitrogen and water.

A reducing agent already used today for nitrogen oxides is urea ($H_2N$—$CO$—$NH_2$) which is added to the exhaust gas in the form of an aqueous urea solution. Here the urea in the exhaust gas flow can decompose into ammonia ($NH_3$), for example under the effect of heat (thermolysis) and/or by reaction with water (hydrolysis). The ammonia formed in this way is the actual reducing agent for nitrogen oxides.

Post-processing systems for exhaust gases have been developed for motor vehicles over a long period and are the subject matter of numerous publications. Thus for example EP 487 886 B1 describes a method for selective catalytic $NO_x$-reduction in oxygenated exhaust gases of diesel engines, in which urea and the thermolysis products thereof are used as reducing agents. In addition, a device is described for producing ammonia in the form of a tube evaporator which comprises a spraying device, an evaporator having an evaporator tube, and a hydrolysis catalyst.

Furthermore, EP 1 052 009 B1 describes a method and a device for carrying out the method for the thermal hydrolysis and metering of urea and/or urea solutions in a reactor by means of an exhaust gas part flow. In the method, a part flow of the exhaust gas is removed from an exhaust gas pipe upstream of the SCR catalyst and directed through the reactor, the part flow charged with ammonia after hydrolysis in the reactor also being returned to the exhaust gas pipe, still upstream of the SCR catalyst.

In addition, EP 1 338 562 B1 describes a device and a method which make use of the catalytic reduction of nitrogen oxides by ammonia. The ammonia is recovered here by means of flash thermolysis from urea in a solid form and the hydrolysis of isocyanic acid, and supplied to the exhaust gas flow of a vehicle.

Furthermore, EP 1 348 840 A1 describes an exhaust gas cleaning facility as a structural unit in the form of a 20-foot container that can be transported as a whole. The system is operated in such a way that a solution of urea or ammonia is injected directly into the exhaust gas flow by means of an injection device. The reduction of the nitrogen oxides contained in the exhaust gas is performed in an SCR catalyst.

Furthermore, DE 10 2006 023 147 A1 describes a device for producing ammonia which is part of an exhaust gas post-processing system.

In addition, WO 2008/077 587 A1 and WO 2008/077588 A1 describe a method for the selective catalytic reduction of nitrogen oxides in the exhaust gases of vehicles by means of aqueous guanidinium salt solutions. In these methods, a reactor is used which produces ammonia from the aqueous guanidinium salt solutions.

Current studies are focussing on more recent developments in the field of exhaust gas post-processing. Thus, recently the concept of producing ammonia outside an exhaust gas pipe has been pursued. Embodiments of generators and methods for operating said generators can be found in PCT/EP2012/062757, PCT/EP2012/062750 and PCT/EP2012/062752.

Even though ammonia gas generators have been known for a long time, until now the technology has not been implemented in a vehicle or developed for another use. Until now the concept of directly injecting an ammonia precursor substance into the exhaust gas flow of an internal combustion engine has been developed, in which said ammonia precursor substance decomposes by suitable means in the exhaust gas pipe into the actual reducing agent. However, as a result of the incomplete decomposition or secondary reactions of decomposition products in the exhaust pipe deposits always build up, which have an adverse effect on the catalysts and filter still present in the exhaust gas pipe.

Therefore, the object of the present invention is to provide an ammonia gas generator and a method for the production of ammonia which overcomes said disadvantages of the prior art. In particular, an ammonia gas generator is to be provided which can be arranged outside an exhaust gas pipe of an exhaust gas system of an internal combustion engine. According to the invention, the ammonia produced and not an ammonia precursor compound can be introduced into the exhaust gas. The object of the present invention is also to provide an ammonia gas generator which has simple design and a compact structure and provides a high conversion rate of ammonia precursor substances to ammonia gas and permits a long period of use without maintenance. In addition, the ammonia gas generator should be able to be used universally, it being possible in particular to also use different types of ammonia precursor substances.

Said object is achieved by an ammonia gas generator according to claim 1 and a method for producing ammonia according to claim 12.

Thus, the present invention relates to an ammonia gas generator for producing ammonia from a solution of an ammonia precursor substance, which comprises i) a catalyst unit, which comprises a catalyst for the decomposition and/or hydrolysis of ammonia precursor substances into ammonia and a mixing chamber arranged upstream of the catalyst, the catalyst having a catalyst volume $V_{Cat}$ and the mixing chamber having a mixing chamber volume $V_{Mix}$, ii) an injection device for introducing the solution of ammonia precursor substance into the mixing chamber, and iii) an outlet for the ammonia gas formed, wherein the injection device comprises a nozzle which produces droplets having a Sauter mean diameter $D_{32}$ of 26 to 100 µm. In particular, the injection device can comprise a nozzle which produces droplets having a Sauter mean diameter $D_{32}$ of 26 to 49 µm and particularly preferably of 26 to 40 µm.

It should be emphasised at this point that an ammonia gas generator according to the present invention is a separate unit for producing ammonia from ammonia precursor substances. A unit of this kind can be used for example for reducing nitrogen oxides in industrial exhaust gases or for the post-processing of exhaust gases from internal combustion engines, such as diesel engines. Said ammonia gas generator can operate independently or also by means of exhaust gas flows, in each case, however, the ammonia formed being introduced into the exhaust gas flow and a reduction of nitrogen oxides by means of ammonia only taking place in a subsequent processing step. If an ammonia gas generator according to the invention is used as a separate component in an exhaust gas post-processing system of an internal combustion engine, for example a diesel engine, in this way the nitrogen oxides can be reduced in the exhaust gas flow without adding additional catalysts for separating ammonia precursor substances or other components into the exhaust gas flow itself. The ammonia produced by the ammonia gas generator according to the invention can thus be introduced as needed into the exhaust gas flow. The potential shortening of the lifetime of the SCR catalyst by impurities in the form of deposits, for example of ammonia precursor substances or products from the splitting of ammonia precursor substances, is also avoided.

Furthermore, in connection with the present invention an injection device, which has a nozzle, is understood as any device or nozzle which sprays, atomises or forms into droplets in another way, a solution, preferably an aqueous solution, of an ammonia precursor substance, wherein the solution of the ammonia precursor substance is formed as droplets which have a droplet diameter $D_{32}$ of 26 to 100 µm. The droplet diameter $D_{32}$ in connection with the present invention relates to the Sauter mean diameter according to the German Industrial Standard DIN 66 141.

Furthermore, a catalyst unit according to the present invention is understood as a unit which comprises a housing for holding a catalyst, a mixing chamber arranged upstream of the catalyst in the flow direction, and at least one catalyst for the decomposition and/or hydrolysis of ammonia precursor substances into ammonia, the catalyst having a catalyst volume $V_{Cat}$ and the mixing chamber having a mixing chamber volume $V_{Mix}$. The mixing chamber is delimited in the flow direction by the catalyst end face on one side and on the other side by the housing of the catalyst unit or by a perforated disc if provided. If necessary, the catalyst unit can also comprise an outlet chamber arranged downstream of the catalyst in the flow direction for emitting the ammonia gas formed.

It has been found that despite having an optimum injection geometry (angle and distance), particularly in an application with a carrier gas flow, there is a suboptimum distribution of the droplets on the catalyst end wall. Completely surprisingly, this problem was able to be addressed by using a nozzle which produces droplets having a Sauter mean diameter $D_{32}$ of 26 to 100 µm. By selecting a specific nozzle or using a specific nozzle which produces droplets having a Sauter mean diameter of 26 to 100 µm, the droplets can be distributed over virtually the entire flow cross section and thus there is a more uniform wetting of the catalyst end face. In this way deposits are in turn prevented and the conversion rate is improved. Without being bound to the theory it can be said that droplets that are too small have too little inertia. In this way the droplet-containing flow is only applied to a portion of the catalyst end face. Because of the greater inertia of larger droplets a droplet-containing flow can be provided which wets almost 100% of the catalyst end face, particularly also in the presence of a carrier gas flow.

In addition, it could be established that droplets having a Sauter mean diameter $D_{32}$ of 26 to 100 µm can be deflected less by the carrier gas flow and there is a more homogenous spray pattern, particularly in the outer regions (region larger than 80% of the diameter) of the catalyst end face and overall a more even distribution on the catalyst. Because of their inertia, droplets having a Sauter mean diameter $D_{32}$ of 26 to 100 µm retain the spray pattern originally defined by the nozzle until reaching the catalyst end face and there is therefore a more even wetting of the catalyst end face according to the set spray angle of the nozzle.

At the same time, by using a nozzle droplets could be produced having a Sauter mean diameter $D_{32}$ of 26 to 100 µm and a simple structure and a compact configuration of the ammonia gas generator itself could be achieved.

Furthermore, completely unpredictably it was found that the power or pressure required for atomising droplets having a larger Sauter mean diameter (corresponds to the formation of a smaller new liquid surface) is much smaller. In this way, a particularly simple structure of the generator is produced.

According to a preferred embodiment of the present invention the injection device can comprise a nozzle which produces droplets having a Sauter mean diameter $D_{32}$ of 26 µm, in particular at least 30 µm and particularly preferably at least 32 µm, the droplets at the same time or independently thereof having a Sauter mean diameter of at most 100 µm, in particular at most 90 µm, particularly preferably at most 80 µm, particularly preferably at most 70 µm, particularly preferably at most 60 µm and most preferably at most 49 µm and even more preferably at most 40 µm.

Thus, according to the present invention it is provided that the injection device in turn comprises a nozzle which produces droplets having a droplet diameter $D_{32}$ in a defined range. By using such nozzles a degree of ammonia formation AG of >97% can be achieved. In addition, there can be a particularly even distribution of the solution on the catalyst end face. The degree of ammonia formation AG is defined here and in the following as the molar amount of $NH_3$ produced in the ammonia gas generator relative to the molar amount of ammonia to be produced theoretically during a complete hydrolysis of the ammonia precursor substance. A degree of ammonia formation of >97% is considered to be complete conversion according to the present invention.

According to the invention, by having an even distribution of droplets it is possible to avoid exceeding the maximum charge on the end face in individual annular regions. Only in this way is it possible to ensure that an almost complete conversion is performed on the entire catalyst end face and that no annular deposits are formed on the catalyst end face after a long period of use. In this way it is possible to avoid additional maintenance.

According to a particularly preferred variant, it is in particular provided that the injection device in turn comprises a nozzle which, according to the present invention, is a so-called dual substance nozzle. A dual substance nozzle is understood here as a nozzle which uses a pressurised gas, generally air, as a propellant for the surface disruption of the liquid phase and thus for the formation of droplets. Said pressurised gas is also referred to as atomising air. Thus, the present invention also relates to an ammonia gas generator which comprises an injection device which is a dual substance nozzle in which the solution to be introduced into the mixing chamber is charged with compressed air.

Alternatively to or independently of this it may also be provided that the ammonia gas generator comprises a nozzle which has a first number of nozzle openings for introducing the solution into the mixing chamber which is surrounded annularly by a second number of nozzle openings for introducing compressed air or carrier gas into the mixing chamber.

Alternatively, it may also be provided that the ammonia gas generator comprises a nozzle which is operated without compressed air. This so-called single substance nozzle or injector operates by mechanical liquid disruption without additional air flow. A single substance nozzle which produces droplets having a Sauter mean diameter $D_{32}$ of 26 to 100 µm is preferred. A single substance nozzle which has a plurality of openings or boreholes is particularly preferred. The combination of more than one single substance nozzle for introducing the solution into the ammonia gas generator is most preferred.

According to a development of the present invention, it is also provided that the ratio of the volume of the mixing chamber $V_{Mix}$ to the volume of the catalyst $V_{Cat}$ corresponds to the ratio of from 1:1 to 5:1. Surprisingly, it has been found that the ammonia precursor substance sprayed in can be broken down fully (conversion>97%) into ammonia when the droplets of the solution have already been evaporated in part before reaching the catalyst end face. This can be ensured by the volume of the mixing chamber being greater than the volume of the catalyst. By evaporating the droplets in part, sufficient energy is supplied to the solution so that excessive cooling is avoided at the catalyst end face by having droplets that are too large and thus it is possible to counteract a worsening of the decomposition or formation of by-products. Furthermore, by having a suitable mixing chamber volume $V_{Mix}$ it is ensured that the sprayed ammonia precursor reaches the catalyst as an aerosol in the transport gas flow which is distributed homogenously over the cross section and that spots having too high a concentration, which would also result in a worse conversion, are avoided. Particularly preferably, it is provide here that the ratio of the volume of the mixing chamber $V_{Mix}$ to the volume of the catalyst $V_{Cat}$ is from 2:1 to 5:1, particularly preferably from 1:1 to 5:1, particularly preferably 3:1 to 5:1 and most preferably 3.5:1 to 5:1.

According to a further preferred embodiment, the ammonia gas generator according to the present invention also comprises at least one inlet for a carrier gas which in particular produces a carrier gas flow aligned perpendicularly to the catalyst end face. In this case it can also be preferred that the ammonia gas generator comprises a perforated disc, in the centre of which the opening of the nozzle is arranged. In this case the perforated disc also preferably comprises a plurality of openings, by means of which the introduced carrier gas flow is separated into a plurality of part flows. The openings are particularly preferably configured such that a plurality of parallel carrier gas part flows can be produced (parallel to the flow direction of the catalyst unit).

In this way, independently of an ammonia gas generator of the aforementioned type, the present invention also relates to an ammonia gas generator for producing ammonia from a solution of an ammonia precursor substance, which comprises i) a catalyst unit, which comprises a catalyst for the decomposition and/or hydrolysis of ammonia precursor substances into ammonia and comprises a mixing chamber arranged upstream of the catalyst, the catalyst having a catalyst volume $V_{Cat}$, and the mixing chamber having a mixing chamber volume $V_{Mix}$, ii) an injection device for introducing the solution of the ammonia precursor substance into the mixing chamber, and iii) an outlet for the formed ammonia gas, wherein the ammonia gas generator also comprises iv) at least one inlet for a carrier gas which produces a carrier gas flow directed perpendicularly to the catalyst end face.

In particular said ammonia gas generator also comprises the injection device, which in turn has a nozzle which produces droplets having a Sauter mean diameter $D_{32}$ of 26 to 100 μm. In particular, the injection device can have a nozzle which produces droplets having a Sauter mean diameter $D_{32}$ of 26 to 49 μm and most preferably of 26 to 40 μm.

Surprisingly, it transpired that during the operation of the ammonia gas generator using a carrier gas flow guided perpendicularly to the catalyst end face (hereinafter synonymous with the transport gas flow) it is possible to prevent deposits on the walls of the catalyst unit in the region of the mixing chamber and it is possible to provide a continuously effective mixing of carrier gas (hereinafter synonymous with the transport gas) and the solution of the ammonia precursor substance. If a carrier gas flow of this kind guided perpendicularly to the catalyst end face is not used, the spraying of the solutions of ammonia precursor substance into the mixing chamber can wet the wall of the catalyst unit in the region of the mixing chamber, and unwanted secondary reactions may occur, such as polymerisation of the ammonia precursor substance. Said secondary reactions result in unwanted deposits in the region of the mixing chamber, whereby the mixing of the carrier gas and solution of ammonia precursor substance, which is extremely important for the functioning of the generator, is no longer possible over the long term. In addition, because of the insufficient mixing of the carrier gas and the solution, further deposits are found in and on the catalyst itself. By means of the carrier gas flow guided perpendicularly to the catalyst end face, a flow of mist is produced with the droplets which is axially guided in the direction of the hydrolysis catalyst onto the hydrolysis catalyst end face. Said flow of mist allows a very effective conversion to ammonia by the catalyst.

The carrier gas is supplied in the head region of the generator, preferably at the level of the injection device of the ammonia precursor solution into the catalyst unit or into the mixing chamber.

The carrier gas and in particular the carrier gas flow guided perpendicularly to the catalyst end face is preferably introduced into the mixing chamber at a temperature of up to 550° C., preferably at a temperature of 250 to 550° C., more preferably at a temperature of 250 to 400° C. and most particularly preferably at a temperature of 300 to 350° C. However, it can also be provided that the carrier gas and in particular the carrier gas flow guided perpendicularly to the catalyst end face is introduced into the mixing chamber at a temperature of less than 250° C., in particular less than 200° C., more preferably less than 150° C., particularly preferably less than 100° C. and most preferably of less than 80° C., the temperature at the same time being at least 10° C., in particular at least 20° C. and particularly preferably 25° C.

It has also been found, surprisingly, that by using a perforated disc the introduced carrier gas flow can be separated into a plurality of part flows and in this way a particularly even distribution of the formed droplets on the catalyst end face can be achieved. The even distribution of the formed droplets on the catalyst end face can in particular be improved further if the opening of the nozzle is arranged in the centre of the perforated disc. In this way by means of the plurality of part flows of carrier gas a casing surrounding all sides can be provided for the injected droplets. Said casing prevents the deposit of ammonia precursor substances or unwanted decomposition products therefrom onto the inner walls of the catalyst unit.

In particular, the present invention provides an ammonia gas generator which operates independently of the exhaust gas flow of an internal combustion engine or an industrial facility, i.e. without the aid of an exhaust gas flow or exhaust gas part flow from a combustion gas, as a carrier gas. In particular, in the ammonia gas generator according to the invention, ammonia is formed from an ammonia precursor substance in the absence of an exhaust gas flow.

In this way according to a further aspect the subject matter of the present invention is also a method for the production of ammonia, in particular for the continual production of ammonia, from a solution of an ammonia precursor substance, in that the ammonia gas generator described herein is used. In this method the solution is introduced into the catalyst unit so that the solution is injected into the catalyst unit in the form of droplets with a Sauter mean diameter $D_{32}$ of 26 to 100 µm. Particularly preferred is a method in which a carrier gas is introduced into the catalyst unit in the form of a carrier gas flow guided perpendicularly to the catalyst end face in particular in the form of parallel jets. In this case it is also particularly preferred that the solution of the ammonia precursor substance is introduced as an aerosol in a plurality of parallel jets of carrier gas.

At the same time or independently thereof, said method can be carried out using a carrier gas or a carrier gas flow guided perpendicularly to the catalyst end face that has a temperature of up to 550° C. Preferably, said carrier gas or said carrier gas flow has a temperature of from 250 to 550° C. or 10 to 200° C. It has been found, surprisingly, that the ammonia gas generator can also be operated using a carrier gas or a carrier gas flow at a temperature below the decomposition temperature of the ammonia precursor substance. In this case, the energy required for the decomposition is substantially provided by the heatable catalyst. Surprisingly, this supply of energy is sufficient to achieve a complete conversion and a high conversion rate of >97%.

Thus, the present invention also in particular also relates to a method in which a carrier gas is introduced into the mixing chamber (51) at a temperature $T_{(K)}$ in the range of 10 to 200° C., wherein the solution is injected into the catalyst unit in the form of droplets having a mean Sauter diameter $D_{32}$ of 26 to 100 µm.

More preferably, the carrier gas and in particular the carrier gas flow guided perpendicularly to the catalyst end face can be introduced or injected into the mixing chamber at a temperature of less than 200° C., more preferably less than 150° C., particularly preferably less than 100° C. and most preferably less than 80° C., at the same time the temperature being at least 10° C., in particular at least 20° C. and most preferably 25° C.

Within the scope of the present invention, as a catalyst for the decomposition and/or hydrolysis of ammonia precursor substances, any catalyst can be used which permits the release of ammonia from the precursor substance under catalytic conditions. A preferred catalyst hydrolyses the ammonia precursor substance to ammonia and additional harmless substances such as nitrogen and carbon dioxide and water. Thus, the catalyst is preferably a hydrolysis catalyst.

If an ammonia precursor substance solution is used, for example a guanidinium salt solution, in particular a guanidinium formate solution, a urea solution or mixtures thereof, the catalytic decomposition to ammonia can take place in the presence of catalytically active, non-oxidation-active coatings of oxides, selected from the group titanium dioxide, aluminium oxide and silicon dioxide as well as mixtures thereof, and/or hydrothermally stabile zeolites, which are completely or in part metal-substituted, in particular ZSM-5 or BEA type iron zeolites. In particular the subgroup elements and preferably iron or copper can be used as the metals. The metal oxides such as titanium oxide, aluminium oxide and silicon dioxide are preferably applied to metal carrier materials, such as heat-conducting alloys (in particular chromium aluminium steels).

Particularly preferred catalysts are hydrolysis catalysts, which comprise in particular catalytically active coatings made of titanium dioxide, aluminium oxide and silicon dioxide, as well as mixtures thereof.

Alternatively, the catalytic decomposition of the ammonia precursor substance, in particular the guanidinium formate solutions or the remaining components, can also be to ammonia and carbon dioxide, catalytically active coatings made of oxides selected from the group titanium dioxide, aluminium oxide and silicon dioxide and mixtures thereof, and/or hydrothermally stable zeolites, which are fully or in part metal-substituted, being used, which are impregnated with gold and/or palladium as oxidation-active components. The corresponding catalysts having palladium and/or gold as active components preferably have a precious metal content of 0.001 to 2 wt. %, in particular 0.01 to 1 wt. %. By means of such oxidation catalysts it is possible to avoid the unwanted formation of carbon monoxide as a by-product during the decomposition of the guanidinium salt, in particular during the decomposition of formates, during ammonia production.

Preferably, for the catalytic decomposition of the guanidinium formate and possibly the additional components a catalytic coating is used comprising palladium and/or gold as active components having a precious metal content of 0.001 to 2 wt. %, in particular 0.01 to 1 wt. %.

Thus, the present invention also relates to an ammonia gas generator which comprises a hydrolysis catalyst having a catalytically active coating which is impregnated with gold and/or palladium, in particular with a gold content and/or palladium content of 0.001 to 2 wt. % (relative to the catalytic coating). More preferably said catalyst has a catalytically active coating of oxides selected from the group titanium dioxide, aluminium oxide and silicon dioxide as well as mixtures thereof, and/or hydrothermally stabile zeolites impregnated with gold and/or palladium, the content of gold and/or palladium is also preferably being 0.001 to 2 wt. % (relative to the catalytic coating).

It is possible within the scope of the present invention to use a hydrolysis catalyst which, in the flow direction, consists of at least two portions, the first portion containing non-oxidation-active coatings and the second portion containing oxidation-active coatings. Preferably, 5 to 90 vol. % of said catalyst consists of non-oxidation-active coatings and 10 to 95 vol. % consists of oxidation-active coatings. In particular, 15 to 80 vol. % of said catalyst consists of non-oxidation-active coatings and 20 to 85 vol. % of oxidation-active coatings. Alternatively, the hydrolysis can also be performed in the presence of two catalysts arranged behind one another, the first catalyst containing non-oxidation-active coatings and the second catalyst containing oxidation-active coatings. More preferably, the first hydrolysis catalyst can also be a heated catalyst and the second hydrolysis catalyst can be a non-heated catalyst.

Furthermore, it can be provided that a hydrolysis catalyst is used which consists of at least two portions, the portion arranged first in the flow direction being in the form of a heated catalyst and the portion arranged second in the flow direction being in the form of non-heated catalyst. Preferably, the catalyst consists by 5 to 50 vol. % of the first portion and 50 to 95 vol. % of the second portion.

According to a particularly preferred embodiment of the present invention, it is therefore provided that the ammonia gas generator comprises a catalyst unit having an at least two-part, particularly preferably at least three-part hydrolysis catalyst, the first part of which in the flow direction is in the form of a heated catalyst, which preferably has a direct electrical resistance heating unit and/or a casing heating unit, whereas the second part is configured in the form of a non-heated catalyst, most preferably followed downstream by a non-heated catalyst having a mixer structure as a third part.

It has been found that for complete catalytic conversion of the ammonia precursor substances, preferably catalysts are used having a catalyst cell count of at least 60 cpsi (cpsi: cells per square inch—cell count on the end face of the catalyst) and the catalyst volume already described above. In this case the increasing counter pressure (loss of pressure over the catalyst) limits the catalyst cell count to at most 800 cpsi for use in an ammonia gas generator. Particularly preferred are catalysts, in particular hydrolysis catalysts, which have a catalyst cell count of 100 to 600 cpsi per inch$^2$ end face, from 100 to 500 cpsi per inch$^2$ end face and most preferably from 100 to 400 cpsi per inch$^2$ end face of the catalyst.

With regard to the configuration of the catalyst unit, it has been shown in tests that a cylindrical structure is particularly suitable. In this way the carrier gas flow can realise its full effect. Other structures are less suitable however as they produce too much turbulence. Thus, the present invention also relates to an ammonia gas generator which comprises a catalyst unit which is designed in the form of a cylinder.

Furthermore, it has proved to be particularly advantageous if the ammonia gas generator comprises a catalyst unit which in turn comprises at least one thermal insulation layer, in particular a thermal insulation layer consisting of microporous insulating material.

Furthermore, it can be provided that the ammonia gas generator also comprises a metering unit for metering the solution of the ammonia precursor substance, arranged upstream of the injection device. Thus the ammonia to be produced can be controlled precisely by said dosing unit. If for example there is an increased emission of nitrogen oxides in the exhaust gas of an engine, by specifically controlling the amount of precursor substance injected by the injection device, a defined amount of ammonia can be released.

Ammonia precursor substances are understood according to the present invention as chemical substances which can be converted into a solution and which can separate off ammonia by means of physical and/or chemical processes or release it in another form. In particular urea, urea derivates, guanidine, biguanidine as well as the salts of said compounds and salts of ammonia can be used as ammonia precursor compounds according to the present invention. In particular, according to the present invention, urea and guanidine or salts thereof can be used. In particular, such salts can be formed which are formed from guanidines and organic or inorganic acids. Guanidinium salts of the general formula (I) are considered to be particularly preferable in this case,

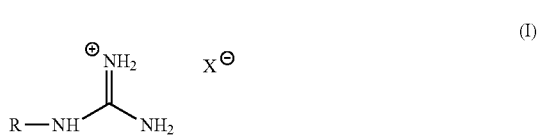

(I)

in which
R=H, NH$_2$ or C$_1$-C$_{12}$-alkyl,

X$^\ominus$ =acetate, carbonate, cyanate, formate, hydroxide, methylate or oxalate.

Guanidinium formate is particularly preferred.

Within the scope of the present invention, said guanidinium salts can be used as individual substances or as a mixture of two or more different guanidinium salts. According to a preferred embodiment, the guanidinium salts used according to the invention are combined with urea and/or ammonia and/or ammonium salts. Alternatively, according to a further embodiment of the present invention, aqueous urea solutions can also be used however. The mixing ratios of guanidinium salt to urea and ammonia or ammonium salts can be varied within broad limits. However, it has been shown to be particularly advantageous if the mixture of guanidinium salt and urea has a guanidinium salt content of 5 to 60 wt. % and a urea content of 5 to 40 wt. %, in particular 5 to 35 wt. %. Furthermore, mixtures of guanidinium salts and ammonia or ammonium salts having a content of guanidinium salt of 5 to 60 wt. % and of ammonia or ammonium salt of 5 to 40 wt. % are considered to be preferred. Alternatively, however, a urea solution can also be used, in particular an aqueous urea solution.

In particular, compounds of the general formula (II) have proved effective as ammonium salts in this case,

(II)

in which
R=H, NH$_2$ or C$_1$-C$_{12}$-alkyl,

X$^\ominus$ =acetate, carbonate, cyanate, formate, hydroxide, methylate or oxalate.

The ammonia precursor substances used according to the invention, in particular guanidinium salts and possibly the additional components, consisting of urea or ammonium salts are used in the form of a solution, in particular water and/or an C$_1$-C$_4$-alcohol preferably being used as the solvents. The aqueous and/or alcoholic solutions in this case have a preferred solids content of 5 to 85 wt. %, in particular 30 to 80 wt. %.

It has been found, surprisingly, that according to the present invention aqueous guanidinium formate solution in a concentration of 20 to 60 wt. % and aqueous urea solution in a concentration of 25 to 40 wt. %, as well as aqueous mixtures of guanidinium formate and urea solutions, guanidinium formate and urea being contained in the mixture in a concentration of 5 to 60 wt. % guanidinium formate and 5 to 40 wt. % urea, can be used particularly effectively.

The aqueous solution of the ammonia precursor substances, in particular the guanidinium salts, the mixtures of guanidinium salts or the guanidinium salts in combination with urea in water in this case have a preferred ammonia formation potential of 0.2 to 0.5 kg ammonia per liter of solution, in particular 0.25 to 0.35 kg ammonia per liter of solution.

Due to their compact structure, the ammonia gas generators described herein are particularly suitable for use in industrial facilities, in internal combustion engines such as diesel engines and petrol engines, as well as gas engines. Therefore, the present invention also relates to the use of an ammonia gas generator of the described type and the use of the described method for reducing nitrogen oxides in exhaust gases from industrial facilities, from internal combustion engines such as diesel engines and petrol engines, and gas engines. Furthermore, the present invention thus also relates to an exhaust gas post-processing system comprising an ammonia gas generator of the type described herein.

In particular, the present invention also relates to an exhaust gas post-processing system which also comprises a Venturi mixer, the outlet for the formed ammonia gas and the Venturi mixer being connected by a pipe, in particular being directly connected. Most preferably, the invention also relates to an exhaust gas post-processing system, which also comprises a Venturi mixer, the outlet for the formed ammonia gas and the Venturi mixer being connected by a pipe, in particular being connected directly, and the Venturi mixer being a component of the exhaust gas pipe of a vehicle, the Venturi mixer being arranged ahead of an SCR catalyst in the flow direction of the exhaust gas.

It has proved to be particularly surprising that by means of the direct connection between the outlet of the ammonia gas generator for the ammonia gas and a Venturi mixer in an exhaust gas pipe of a motor vehicle, a drop in pressure can be created, by means of which the produced ammonia can be introduced without additional aids into the exhaust gas pipe. It is essential in this case that the ammonia gas is introduced directly into the Venturi mixer. Thus at the same time there can also be a sufficiently high degree of turbulence of the exhaust gas to be reduced and the ammonia gas.

Preferably, the arrangement of the injection device and the hydrolysis catalyst inside the ammonia generator according to the invention is such that the injection device comprises a nozzle which has a theoretical spray angle α of from 10 degrees to 90 degrees and the distance of the nozzle opening to the end face of the catalyst is from 15 to 2.000 mm.

More preferably, the solution of the ammonia precursor substance is introduced such that the end face charging of the catalyst is 0.2 to 15 g/(h·cm$^2$), preferably at least 1.0 and even more preferably at least 3.0 g/(h·cm$^2$).

Figure 2:
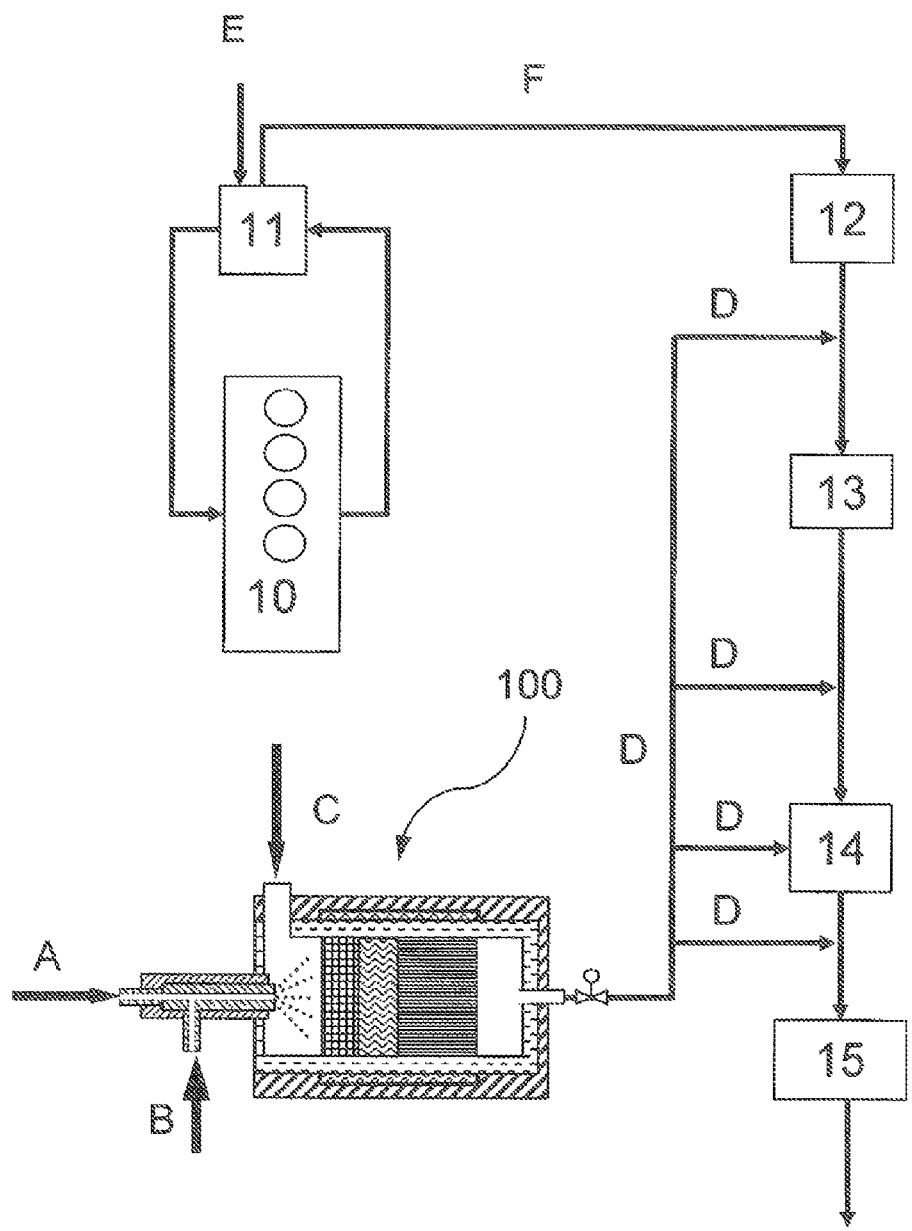
Figure 3:
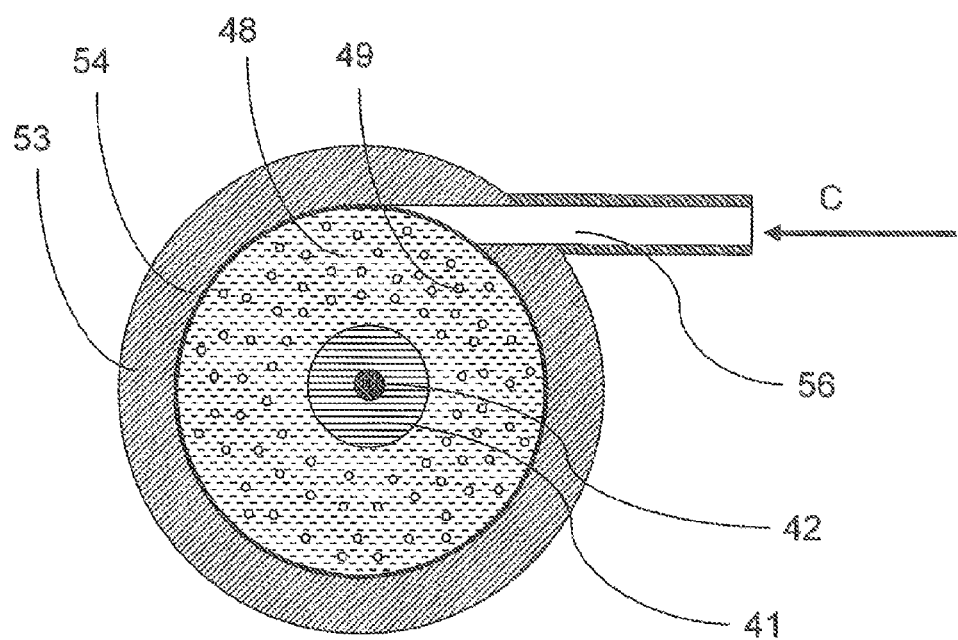

The present invention is explained in more detail in the following with reference to drawings and related examples. In the drawings:

FIG. 1: is a schematic view of an ammonia gas generator according to the invention in axial cross section, FIG. 2: is a schematic view of an exhaust gas system in a vehicle, FIG. 3: is a radial cross section of the mixing chamber (plan view) in the region of the carrier gas flow supply.

FIG. 1 shows a first ammonia gas generator (100) according to the present invention. The generator (100) is in the form of a cylinder and comprises an injection device (40), a catalyst unit (70) and an outlet (80) for the ammonia gas formed. The catalyst unit (70) consists of a multi-part hydrolysis catalyst (60), a mixing chamber (51) and an outlet chamber (55). The mixing chamber is delimited in the longitudinal direction (flow direction) by a perforated disc (48) having a plurality of openings. In the operating state the ammonia precursor solution (B) is injected from a supply container (20) via a metering pump (30) together with an atomising air flow (A), via a dual substance nozzle (41) having a nozzle opening (42), into the mixing chamber (51) of the ammonia gas generator (100) at a defined spray angle and distributed in fine droplets. In addition, a carrier gas flow (C) is introduced via the inlet (56) into the mixing chamber (51). Said carrier gas flow (C) is directed towards a perforated disc (48), in the centre of which the opening (42) of the nozzle (41) is arranged. The nozzle opening (42) is positioned at the level of the perforated disc. Through the perforated disc (48), which has a plurality of openings (49), the carrier gas flow is produced as a plurality of part flows of carrier gas parallel to the flow direction of the catalyst unit, whereby mist of droplets of the injected ammonia precursor substance solution is produced which is axially guided in the direction of the hydrolysis catalyst (60) to the hydrolysis catalyst end face (61). The catalyst (60) is configured such that the first segment (62) is an electrically heatable metal carrier having a hydrolysis coating. This is followed by an unheated metal carrier catalyst (63) also having a hydrolysis coating and a non-heated catalyst (64) having a hydrolysis coating configured as a mixing structure for better radial distribution. The ammonia gas (D) produced leaves the generator (100) together with the hot carrier gas flow via the outlet chamber (55) comprising the outlet (80) and valve (81). The generator can be heated additionally by a casing heating unit (52) around the housing (54) of the catalyst unit. Apart from the head region in which the injection device (40) is situated, the ammonia gas generator (100) is surrounded by thermal insulation (53) consisting of microporous insulating material.

FIG. 2 is a schematic representation of a flow of substances in the exhaust gas post-processing of an internal combustion engine (10). Here the exhaust gas from the internal combustion engine (10) is guided over a charging unit (11) and compressed in counterflow air intake (E) for the internal combustion engine. The exhaust gas (F) is guided over an oxidation catalyst (12) in order to achieve a greater NO$_2$ concentration relative to NO. The ammonia-containing gas flow (D) from the ammonia gas generator (100) can be added and mixed in both upstream and downstream of a particle filter (13). An additional gas mixer (14) can be used in the form of a static mixer or e.g. a Venturi mixer. It is also possible for it to be provided that the ammonia-containing gas flow (D) is introduced into the exhaust gas pipe at the level of the additional gas mixer (14) or into the additional gas mixer (14) or after the additional gas mixer (14). In each case, however, the ammonia-containing gas flow (D) is introduced into the exhaust gas pipe ahead of the SCR catalyst (15). The NO$_x$ is reduced by means of the reducing agent NH$_3$ in the SCR catalyst (15) (SCR=selective catalytic reduction). In this case the ammonia gas generator can be operated with a separate carrier gas or even with an exhaust gas part flow.

FIG. 3 shows a detail of the mixing chamber (51) in the region of the carrier gas flow supply. The housing (54) of the catalyst unit is surrounded in the region of the mixing chamber (51) by thermal insulation (53) consisting of microporous insulating material. The carrier gas (C) is supplied in the head region of the ammonia gas generator or in the head region of the mixing chamber (51). The inlet (56) for the carrier gas flow (C) is designed such that the inlet (56) is arranged behind the perforated disc (48) in the flow direction of the catalyst. A perforated disc (48) having a plurality of holes (49) is arranged at the level of the opening (42) of the nozzle (41). Said perforated disc produces a plurality of carrier gas part flows which in turn control a downwards-directed mist in the generator in the direction of the catalyst.

EXAMPLES

Embodiment 1

The design corresponds in principle to the ammonia gas generator shown in FIG. 1.

The ammonia generator is set up for a metering amount of 50-2000 g/h $NH_3$ and configured as a cylindrical tube reactor. A dual-substance nozzle of the company Albonair (Albonair metering system) having a spray angle of alpha=20° is arranged in the centre of the head region. The Sauter mean diameter in the selected operating range is $D_{32}$=37 μm. The length of the mixing chamber is about 250 mm.

Around the nozzle opening is a perforated disc having a diameter of 90 mm over the whole cross section and a recess of 30 mm around the centrally arranged nozzle. The nozzle opening is at the level of the perforated disc. The bores of the perforated disc are all 5 mm and are distributed evenly over the cross section.

In a further embodiment the bores increase in size from the inside (3 mm) to the outside (8 mm). The perforated disc in front of the nozzle outlet produces a low dynamic pressure of 0.2 to 2 mbar and thereby an even axial flow of the transport gas and thereby in particular in the edge region a flow is imposed, which surrounds the wall region as a protective mist (mist flow). This prevents droplets being spun against the wall by too powerful turbulence which could cause deposits to form and reduce the total amount of ammonia formed from the usual level of 97% to below 90%.

The whole region of the mixing chamber including the metal perforated disc is coated with a hydrolysis catalyst (catalytically active $TiO_2$, anatas, washcoat about 100 g/l, from the company Interkat) to avoid unwanted secondary reactions of the sprayed solution that may possibly land on the surfaces.

It has been shown that by evenly distributing the droplets on the catalyst end face the catalyst surface does not get overloaded in an undesirable, point-like manner. In this case the whole surface is used for converting the solution into ammonia without by-products. In this way no deposits can be formed, as has been shown in tests having running times of several 100 hours. If no deposits are found it can be assumed that a complete conversion of the ammonia precursor solution has taken place. In this case maintenance to remove deposits is no longer necessary.

It has been shown that for this design aqueous guanidinium formate solution in a concentration of 20% to 60%, as well as an aqueous urea solution in a concentration of 25% to 40% and also aqueous mixtures of guanidinium formate and urea can be used as the ammonia precursor solution.

The remaining droplets cool the catalyst end face by about 120-150° C. For this reason the reactor is configured such that the amount of heat supplied by the hot carrier gas flow, the integrated heatable hydrolysis catalyst and additional power supplies provide so much energy that, for the metered amount of solution, no cooling occurs below about 280° C.

In addition to the sprayed solution, a hot carrier gas flow of about 1-5 kg/h is also introduced in the head region of the ammonia gas generator so as to lie in a mist around the inner wall of the catalyst unit and be directed in a laminar manner through the mixing chamber. This also prevents sprayed droplets coming into contact with the inner wall. The carrier gas flow is branched off pre-turbo and supplied by a restricting device to the ammonia generator. By means of the higher pressure pre-turbo the required difference in pressure of 10 mbar is overcome by the reactor to the mixing point in the exhaust gas flow before the SCR catalyst and thus the carrier gas flow is moved through the reactor. The temperature of the exhaust gas part flow is between 250° C. and 550° C. depending on the operating state. The temperature is controlled in connection with temperature sensors (type K) arranged on the catalyst end face in and after the catalyst. All of the outer surfaces of the reactor are surrounded by insulation. Only the head region, in which the solution is injected, is not insulated for better heat dissipation.

A heatable metal carrier catalyst having a diameter of 90 mm and 300 cpsi is flange-mounted onto the mixing chamber (Emitec Emicat, maximum power 900 W). Said catalyst is in the form of a hydrolysis catalyst, coated with catalytically active $TiO_2$ (anatas, washcoat about 100 g/l, from the company Interkat) and is controlled such that the temperature at the catalyst end face is between 280 and 400° C. In this case only so much power is supplied for the cooling to be compensated by the vaporisation of the droplets. To achieve a space velocity of up to a minimum of 7.000 1/h a further hydrolysis catalyst of 400 cpsi is arranged downstream, so that there is a total catalyst volume of about 900 ml.

The ammonia produced at the hot hydrolysis catalyst flows freely in the base region, centrally from an outlet opening out of the reactor end part. In this case the outlet region is preferably conical in order to avoid the formation of turbulence at edges and thus deposits of possible residues. The gas mixture from the ammonia gas generator is preferably added to the engine exhaust gas flow ahead of the SCR catalyst at a temperature of >80° C. to avoid ammonium carbonate deposits and distributed homogenously in said exhaust gas flow by a static mixer.

As the material for all of the metal components, 1.4301 Fe—Cr—Al alloys are used (V2A, DIN X 5 CrNi18-10) alternatively 1.4401 (V4A, DIN X 2 CrNiMo 17-12-2), 1.4767 or even other exhaust gas catalyst-typical Fe—Cr—Al alloys.

Embodiment 2

In embodiment 2 the ammonia generator is configured such that, instead of a dual substance nozzle, a single substance nozzle having a comparable spraying pattern is used (injector, Hilite Gen 2 liquid only). In this case the atomisation is achieved completely without additional compressed air. The Sauter mean diameter in this embodiment is $D_{32}$=29 μm. Accordingly, in this embodiment no compressed air or additional air pump is necessary for the atomisation.

Embodiment 3

In embodiment 3 the ammonia generator is operated such that surrounding air is suctioned as a carrier gas flow through the ammonia generator. The generator corresponds to the embodiment in example 1. Cold surrounding air is used as the carrier gas flow instead of a hot exhaust gas subsidiary flow. The temperature of the surrounding air is between 10° C. and 25° C. The pressure difference via the reactor to the mixing-in point in the exhaust gas flow is overcome by a Venturi nozzle in the exhaust gas flow. In the exhaust gas flow upstream of the SCR catalyst a Venturi gas mixer is installed in such a way that a corresponding negative pressure suctions surrounding air as the carrier gas flow in and through the reactor and mixes gas enriched with ammonia into the waste gas flow. The mixing point of the ammonia-containing gas from the reactor is arranged centrally in the Venturi nozzle integrated into the exhaust gas flow at the narrowest cross section. By means of a plurality of bores in the Venturi nozzle narrow point the gas is suctioned out of the reactor and supplied to the exhaust gas flow distributed evenly in a radial manner.

The invention claimed is:

1. An ammonia gas generator for producing ammonia gas from a solution of an ammonia precursor substance comprising:
   i) a catalyst unit, which comprises a catalyst for the decomposition and/or hydrolysis of ammonia precursor substances into ammonia and a mixing chamber arranged upstream of the catalyst, wherein the catalyst has a catalyst volume $V_{Cat}$ and the mixing chamber has a mixing chamber volume $V_{Mix}$;
   ii) an injection device for introducing the solution of the ammonia precursor substance into the mixing chamber;
   iii) an inlet for a carrier gas for forming a plurality of parallel jets of carrier gas; and
   iv) an outlet for the ammonia gas formed,
wherein the injection device comprises a nozzle which produces droplets with a Sauter mean diameter $D_{32}$ of 26 to 100 µm, wherein the ratio of the volume of the mixing chamber $V_{Mix}$ to the volume of the catalyst $V_{Cat}$ corresponds to the ratio of from 1:1 to 5:1, and wherein the opening of the nozzle is arranged such that the solution of ammonia precursor substance is introduced as an aerosol into the plurality of parallel jets of carrier gas.

2. The ammonia gas generator of claim 1, wherein the injection device comprises a nozzle which produces droplets with a Sauter mean diameter $D_{32}$ of 26 to 40 µm.

3. The ammonia gas generator of claim 1, wherein the injection device is a dual substance nozzle in which the solution of the ammonia precursor substance to be introduced into the mixing chamber is charged with the carrier gas.

4. The ammonia gas generator of claim 1, wherein the nozzle has a first number of openings for inserting the solution into the mixing chamber, which is surrounded annularly by a second number of nozzle openings for introducing compressed air into the mixing chamber.

5. The ammonia gas generator of claim 1, wherein the nozzle is a single substance nozzle or an injector.

6. The ammonia gas generator of claim 1, wherein the ammonia gas generator comprises a perforated disc and the opening of the nozzle is arranged centrally in the perforated disc.

7. The ammonia gas generator of claim 1, wherein the ammonia gas generator comprises a perforated disc having a plurality of openings therethrough.

8. The ammonia gas generator of claim 1, wherein the catalyst is a hydrolysis catalyst.

9. The ammonia gas generator of claim 1, wherein the ammonia gas generator comprises a metering unit for metering the solution of ammonia precursor substance, the metering unit being arranged upstream of the injection device.

10. A method for producing ammonia from a solution of an ammonia precursor substance using an ammonia gas generator comprising:
   i) a catalyst unit, which comprises a catalyst for the decomposition and/or hydrolysis of ammonia precursor substances into ammonia and a mixing chamber arranged upstream of the catalyst, wherein the catalyst has a catalyst volume $V_{Cat}$ and the mixing chamber has a mixing chamber volume $V_{Mix}$;
   ii) an injection device for introducing the solution of the ammonia precursor substance into the mixing chamber; and,
   iii) an outlet for the ammonia gas formed;
   the method comprising:
   introducing the solution of ammonia precursor substance into the mixing chamber by injecting droplets with a Sauter mean diameter $D_{32}$ of 26 to 100 wherein the ratio of the volume of the mixing chamber $V_{Mix}$ to the volume of the catalyst $V_{Cat}$ corresponds to the ratio of from 1:1 to 5:1; and wherein the solution of the ammonia precursor substance is introduced as an aerosol into a plurality of parallel jets of carrier gas.

11. The method of claim 10, further comprising introducing into the mixing chamber a carrier gas or a carrier gas flow, at a temperature $T_{(K)}$ in the range of 10 to 200° C.

12. The method of claim 10, further comprising introducing into the mixing chamber a carrier gas or a carrier gas flow, at a temperature $T_{(K)}$ in the range of 250 to 550° C.

13. An exhaust gas post-processing system for exhaust gas pipes of vehicles, the system comprising the ammonia gas generator of claim 1.

14. The system of claim 13, further comprising a Venturi mixer, wherein the outlet for the ammonia gas formed and the Venturi mixer are connected by a pipe.

15. The system of claim 14, wherein the Venturi mixer is a component of the exhaust gas pipe of a motor vehicle.

16. A method for of reducing nitrogen oxides in exhaust gases, the method comprising treating an exhaust gas from an internal combustion engine, a gas engine, a diesel engine, or a petrol engine with the ammonia gas formed by the ammonia gas generator of claim 1.

17. The ammonia gas generator of claim 3, wherein the carrier gas is compressed air.

18. The ammonia gas generator of claim 1, wherein the inlet for the carrier gas produces a carrier gas flow aligned perpendicularly to a catalyst end face of the catalyst.

19. The ammonia gas generator of claim 7, wherein the plurality of openings of the perforated disc split the carrier gas into a plurality of gas streams parallel to a flow direction of the catalyst unit.

20. The method of claim 10, wherein the solution of ammonia precursor substance is injected into the mixing chamber in the form of droplets with a Sauter mean diameter $D_{32}$ of 26 to 40 µm.

21. The method of claim 11, wherein the carrier gas flow is guided perpendicularly to a catalyst end face of the catalyst.

22. The method of claim 11, wherein the carrier gas or carrier gas flow is injected into the mixing chamber at a temperature $T_{(K)}$ in the range of 10 to 200° C.

23. The method of claim 12, wherein the carrier gas flow is guided perpendicularly to a catalyst end face of the catalyst.

24. The method of claim 12, wherein the carrier gas or carrier gas flow is injected into the mixing chamber at a temperature $T_{(K)}$ in the range of 10 to 200° C.

25. The method of claim 14, wherein the outlet for the ammonia gas formed and the Venturi mixer are connected through a direct connection.

26. An ammonia gas generator for producing ammonia gas from a solution of an ammonia precursor substance comprising:
   i) a catalyst unit, which comprises a catalyst for the decomposition and/or hydrolysis of ammonia precursor substances into ammonia and a mixing chamber arranged upstream of the catalyst, wherein the catalyst has a catalyst volume $V_{Cat}$ and the mixing chamber has a mixing chamber volume $V_{Mix}$;
   ii) an injection device for introducing the solution of the ammonia precursor substance into the mixing chamber;
   iii) an inlet for a carrier gas;

iv) a perforated disc which has a plurality of openings by means of which the carrier gas is separated into a plurality of parallel jets; and v) an outlet for the ammonia gas formed, wherein the injection device comprises a nozzle which produces droplets with a Sauter mean diameter $D_{32}$ of 26 to 100 μm, wherein the ratio of the volume of the mixing chamber $V_{Mix}$ to the volume of the catalyst $V_{Cat}$ corresponds to the ratio of from 1:1 to 5:1, and wherein the opening of the nozzle is arranged centrally with respect to the perforated disc such that the solution of the ammonia precursor substance is introduced as an aerosol into the plurality of parallel jets of the carrier gas.

* * * * *